July 20, 1965 D. S. HABERMAN 3,195,591
PORTABLE TABLE FOR CIRCULAR SAW
Filed Feb. 26, 1963 2 Sheets-Sheet 1
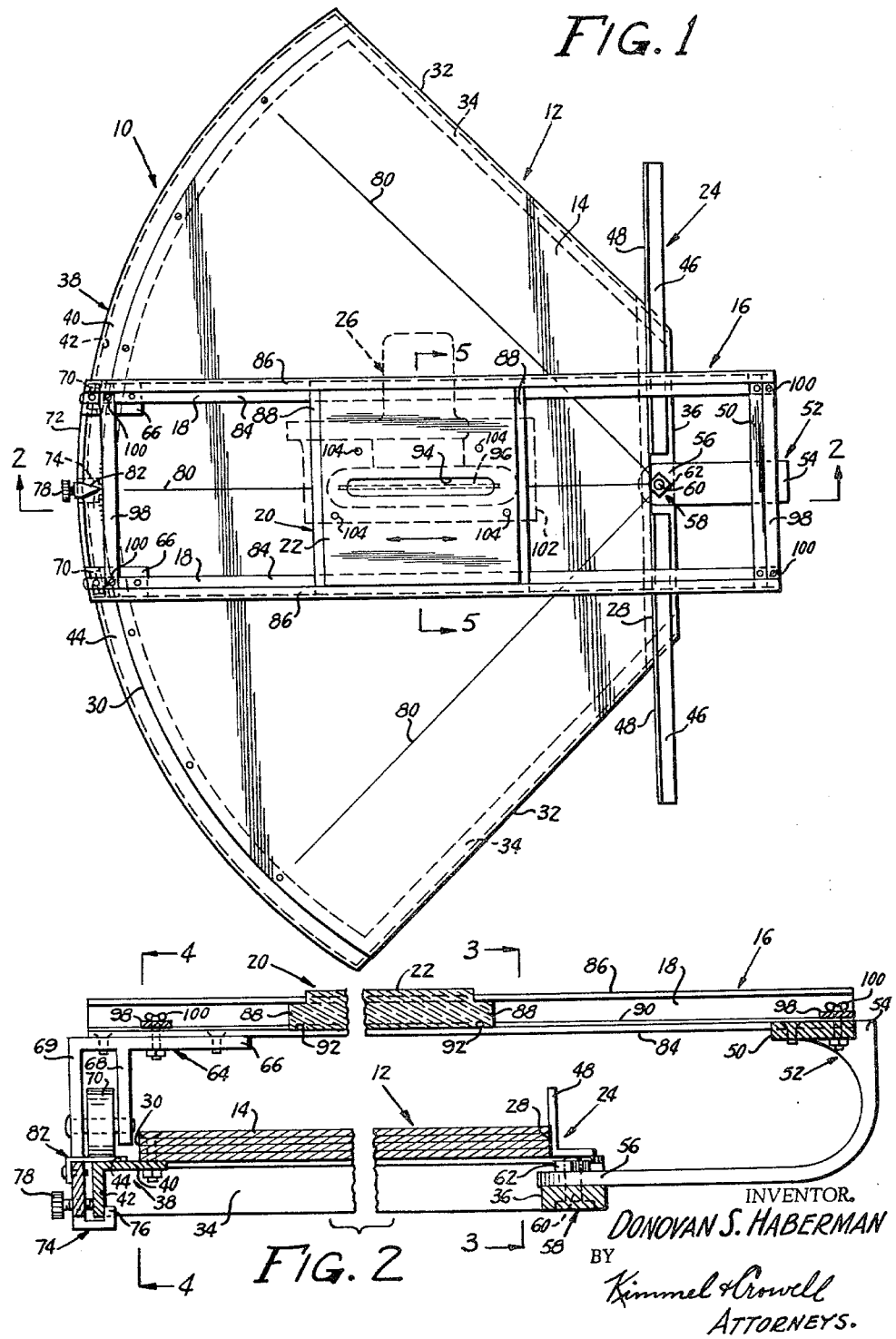
INVENTOR.
DONOVAN S. HABERMAN
BY
Kimmel & Crowell
ATTORNEYS.

July 20, 1965 D. S. HABERMAN 3,195,591
PORTABLE TABLE FOR CIRCULAR SAW
Filed Feb. 26, 1963 2 Sheets-Sheet 2

INVENTOR.
DONOVAN S. HABERMAN
BY
Kimmel & Crowell
ATTORNEYS.

3,195,591
PORTABLE TABLE FOR CIRCULAR SAW
Donovan Sylvester Haberman, 2204 Middleberry Road,
North Sacramento, Calif.
Filed Feb. 26, 1963, Ser. No. 261,119
2 Claims. (Cl. 143—6)

This invention relates to a portable table for a circular saw and relates more particularly to such a table having means to support and guide the circular saw for performing straight and angular cross cut sawing operations and ripping operations on a workpiece.

A primary object of the instant invention is the provision of an improved portable table for a circular saw which is sturdy and durable in construction, reliable and efficient in operation, and relatively simple and inexpensive to manufacture, assemble, utilize, and maintain.

A further object of this invention is to provide a table for a circular saw which is relatively lightweight and compact thereby rendering it portable to facilitate handling and storage.

Another object of this invention is the provision of a portable circular saw table wherein straight or angular cross cut sawing operations may be performed on a suitable workpiece with relatively little adjustment.

A further object of this invention is the provision of a table of the type described which may be readily converted to perform ripping operations on the workpiece.

A still further object of this invention is to provide a portable table for circular saws having a saw guide means comprised of a pair of parallelly extending spaced track members and a saw support means having edge portions receivable in the track members for sliding engagement with respect thereto, the saw support means having an elongated slot therein for passage of the saw blade.

Another object of the instant invention is to provide a device of the character described wherein the saw support means is transparent to facilitate aligning the saw blade with the workpiece.

A further object of this invention is the provision of a portable table for a circular saw having a pair of spaced track members for slidingly receiving opposed edge portions of a saw support means, the saw support means being substantially square and being removable from the track members in order to turn the saw support means 90° and reinsert the same into the track members so that both cross cut and ripping operations may be performed with the same device.

Another object of this invention is the provision of a portable table for a circular saw which is substantially trapezoidal in shape having one substantially straight edge portion adjacent which a workpiece guide fence is fixedly secured and one end of a pair of spaced track members is pivotally secured and an opposed substantially arcuate edge portion adjacent which the opposite end of the spaced track members are slidingly supported, the track members being maintained a predetermined distance above a table member for reception of a workpiece therebetween.

A still further object of the instant invention is the provision of a device of the character described having means to angularly adjust the saw guide means with respect to a table member and locking means to secure the angular relationship once it has been set as desired.

Other and further objects reside in the combinations of elements, arrangements of parts, and features of construction.

Still other objects will in part be obvious and in part be pointed out as the description of the invention proceeds and as shown on the accompanying drawings wherein:

FIGURE 1 is a top plan view of a portable table in accordance with the instant invention showing a circular saw supported thereon in dotted lines;

FIGURE 2 is an enlarged longitudinal cross-sectional view taken substantially on line 2—2 of FIGURE 1, with parts broken away for illustrative clarity;

Similar reference characters refer to similar parts throughout the several views of the drawings.

Figure 3:
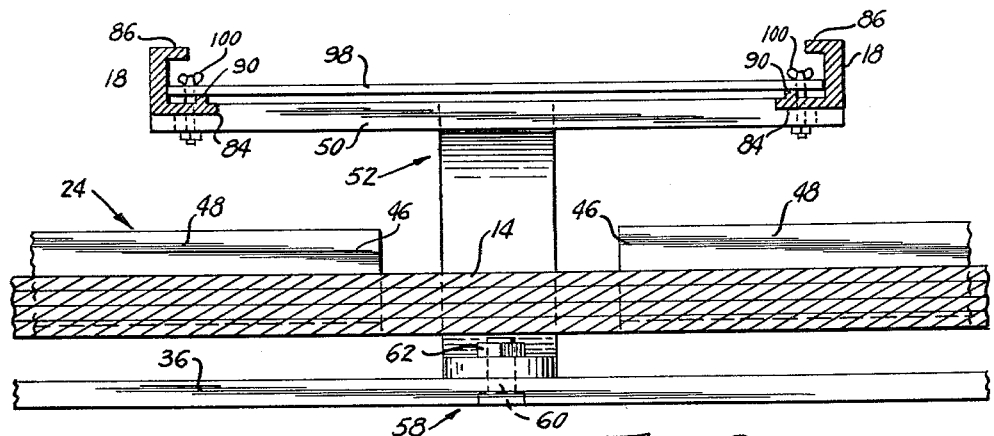
FIGURE 3 is an enlarged fragmentary transverse cross-sectional view taken substantially on line 3—3 of FIGURE 2.

Referring now to the drawings in general and more particularly to FIGURE 1, reference numeral 10 generally designates a portable table for a circular saw in accordance with the instant inventive concept. The table 10 comprises a base member 12 including a table member 14, a saw guide means 16 including a pair of spaced track members 18, a saw support means 20 including a plate member 22 slightly carried by the track members 18 and a workpiece guide fence 24 for bracing and guiding a workpiece (not shown). A conventional circular saw 26 is indicated schematically in dotted lines.

The base means 12 includes the table member 14 which is preferably formed of plywood or other such material to avoid damage to the saw blade in the event of contact therewith. The table member 14 has a substantially straight edge portion 28, an opposed substantially arcuate edge portion 30 and a pair of angular side edge portions 32, 32. Side angle frame members 34 are secured beneath the table member 14 adjacent each side edge portion 32 and a bottom cross support 36 extends between the side angle frame members 34 adjacent the substantially straight edge portion 28 for a purpose to be described further hereinafter. A substantially arcuate angle member 38 is secured adjacent the substantially arcuate edge portion 30 of the table member 14 and includes a first flange 40 parallel to, and underlying, the table member 14 and a second flange 42 perpendicular the the first flange 40 and extending downwardly from the table member 14. The first flange 40 provides an upper surface 44 extending beyond the substantially arcuate edge portion 30 of the table member 14 and acting as a rail means as will be more fully explained hereinafter.

The workpiece guide fence 24 comprises a pair of substantially L-shaped fence members 46 each having a vertical flange 48 extending upwardly above the upper surface of the table member 14 for slidably engaging and bracing the edge of a workpiece (not shown). The fence members 48 are spaced apart at the center of the substantially straight edge portion 28 to allow the passage of the saw blade during a cross cut sawing operation as will be set forth in more detail hereinafter.

The guide members 18 of the saw guide means 16 are secured to each other at one end by a cross brace 50 which may be integrally formed as a portion of a first guide means support member 52. The first guide means support member 52 is substantially J-shaped as will be seen best in FIGURE 2 and has a first end portion 54 secured to the cross brace 50 and a second end portion 56 pivotly secured to the bottom cross support 36 by a removable pivot means 58, such as a bolt means 60 secured through aligned apertures in the cross member 36 and in the end portion 56 of the first guide means support member 52, and a nut means 62 threadably secured to the bolt means 60. Note particularly FIGURES 2 and 3.

Figure 4:
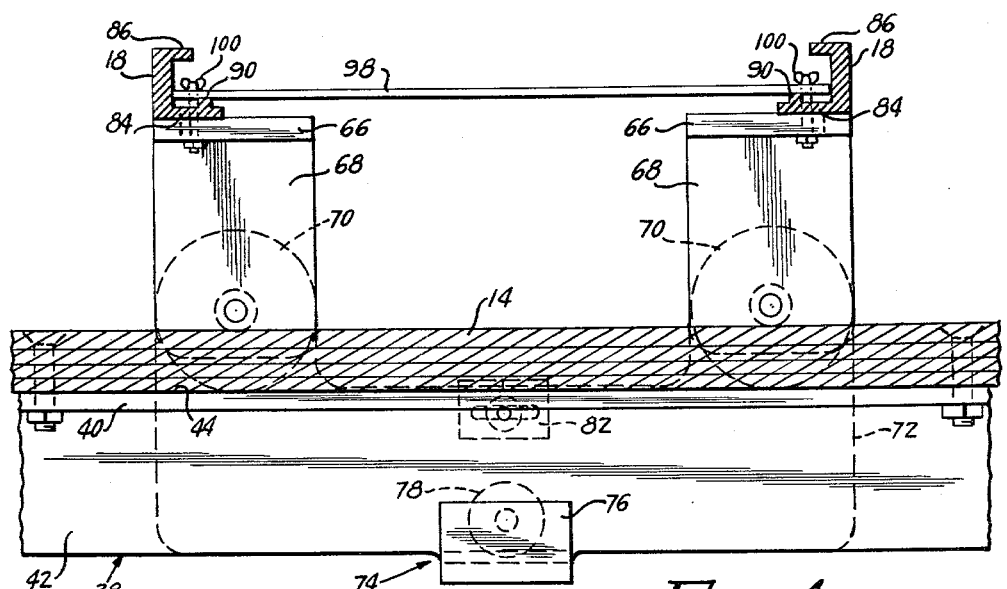
FIGURE 4 is an enlarged fragmentary transverse cross-sectional view taken substantially on line 4—4 of FIGURE 2.

The opposite end of the track members 18 of the saw guide means 16 are supported in spaced relationship to the table member 14 by a second guide means support member 64 which includes a pair of flanges 66, one secured to each of the track members 18 and a pair of downwardly extending spaced flange members 68, 69 rotatably supporting therebetween roller means 70 which ride on rail means 44 of the angle member 38. Note particularly FIGS. 2 and 4. The outer flange members 69, 69 are connected by a portion 72 adjacent their lower end. The connecting portion 72 includes a locking means 74 which comprises a substantially U-shaped element having a first upwardly extending member 76 engageable behind the second flange 42 of the angle member 38 and a second upwardly extending member which is integral with the bottom of the connecting portion 72. A screw means 78 is threadably secured in the connecting portion 72 and is engageable with the front of the second flange 42 of the angle member 38 for locking the angular relationship of the saw guide means 16 with respect to the table member 14.

Guide lines 80 may be defined on the upper surface of the table member 14 to delineate 90° with respect to the workpiece guide fence 24 and 45° on each side thereof or any other angular relationship desired. An indicating means 82 such as a pointer or the like may be provided to further assist the operator in determining the angular relationship existing between the saw guide means 16 and the table member 14.

The track members 18 are preferably substantially C-shaped and have lower inwardly extending guide flanges 84 connected to upward inwardly extending securing flanges 86 for receiving opposed rabbetted edge portions 88 on the plate member 22 for sliding engagement therewith. The upper securing flanges 86 prevent jumping of the plate member 22 of the saw support means 20 from the track members 18. Runners 90 are also preferably provided on the lower guide flanges 84 for reception in guide grooves 92 underneath the opposing edge portions 88 of the plate member 22.

Figure 5:
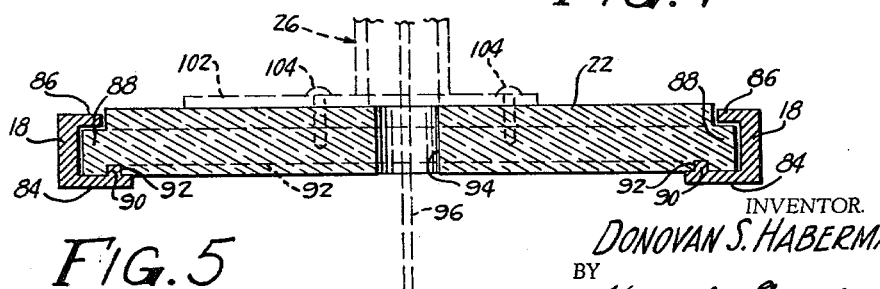
FIGURE 5 is an enlarged detail view through the saw guide means and saw support means of the device of the instant invention, with a portion of a circular saw shown in dotted lines.

The plate member 22 of the saw support means 20 is preferably substantially square and has an elongated slot means 94 defined therein for reception of the saw blade indicated in dotted lines at 96 in FIGURE 5. All four edge portions of the plate member 22 may be rabbetted as at 88 and provided with guide grooves such as 92 so that the plate member 22 may be removed from the track members 18 at either end thereof and turned 90° to dispose the slot means 94 transversely of the track members 18 for ripping operations on the workpiece in a manner to be more fully described hereinafter. Stop means 98, comprised of elongated bars or the like, may be detachably secured by wing bolts or the like 100 adjacent each end of the saw guide means 16 to prevent removal of the plate member 22.

The circular saw 26 normally has a base plate such as shown in dotted lines at 102 which is detachably secured to the plate member 22 of the saw support means 20 by screws 104 or the like. Note particularly FIGURES 1 and 5.

The use and operation of the device of the instant invention will now be apparent. The circular saw 26 is secured to the saw support means 20 by the screws 104 and the angle of cut is determined by releasing the screw means 78 and pivoting the saw guide means 16 about its pivot means 58 with the roller means 70 riding on the arcuate rail means 44 of the angle member 38. The screw means 78 is then threadably engaged against the second flange 42 of the angle member 38 to lock the elements in a desired position. A workpiece (not shown) is held by the operator in engagement with the upwardly extending flanges 48 of the workpiece guide fence 24. The saw support means 20 is then slid in the track members 18 toward the workpiece until the desired cross cut has been completed. It is to be noted that the saw guide means 16 extend beyond the substantially straight edge portion 28 of the table member 14 so that the circular saw 26 can be slid past the space between the fence members 46 to completely cut through the workpiece.

If a ripping operation is necessary, one of the stop means 98 can be removed from the track members 18 and the plate member 22 of the saw support means 20 can be slid from the free end and turned 90° to be reinserted with its slot means 94 extending transversely of the track members 18. Then, with the saw guide means 16 secured substantially 90° with respect to the workpiece guide fence 24, the saw support means 20 is maintained a predetermined distance from the upwardly extending flanges 48 and the workpiece is slid along its engagement with the flanges 48 past the saw blade 96 to rip the workpiece longitudinally of its grain.

It is to be understood that any desired rabbetting or grooving operation can be easily performed by varying the depth of cut of the saw blade 96 in the conventional manner.

It will now be seen that there is herein provided an improved portable table for a circular saw which satisfies all of the objectives of the instant invention and others including many advantages of great practical utility and commercial importance.

Since many modifications may be made of the instant inventive concept and since many embodiments may be made of the modifications hereinbefore shown and described, it is to be understood that all matter herein is to be interpreted merely as illustrative, and not in a limiting sense.

I claim:
1. A portable table for a circular saw including a saw blade, comprising
   (1) a base means including a substantially horizontal table member bounded in plan view by a broken line perimeter of a quadrant of a circle diminished at the perimeter portion opposite the arc by an isosceles triangle whose equal sides are approximately one-third the radius of the quadrant,
   (2) saw guide means including a pair of laterally fixedly spaced parallel track members, each of such length that their ends overlie the arcuate angle indicating front portions of the perimeter of the base means and also overlie the straight work piece guiding back portion of the perimeter opposite the arcuate portion, the track ends all being directly supported upon the base and in equal vertical spaced relation with respect to said table member,
   (3) one end of said saw guide means being pivotally secured to said base means at a position overlying the midpoint of said straight back portion of the table perimeter for selective angular movement thereabout of over ninety degrees with respect to said table member, the other end of said guide means simultaneously selectively travelling the front arcuate angle indicating perimeter of said base,
   (4) saw support means including a square plate member having an elongated central slot means for receiving the saw blade therethrough, and means securing the saw to said plate member, said plate member including first opposed edges parallel to said slot and similar shaped second opposed edges transverse to said slot,
   (5) whereby said first opposed edges may be slidingly received in said track members for cross-cut sawing operations on a work piece positioned between said table member and said track members, and said second opposed edges may be slidingly received in said track members for rip-sawing operations on said work piece,
   (6) said track members each being block-C-shaped in cross section and having a lower inwardly extending horizontal guide flange with an upstanding horizontal top runner spaced from the free end of the lower guide flange, a vertical web portion connected to and extending from said lower guide flange, and an upper inwardly extending horizontal securing flange, the vertical distance between the horizontal top portions of the lower flange and the horizontal bottom portion of the upper flange being less than the vertical thickness of said square plate, (7) the cross sectional shape of each edge of the plate including a vertical terminal edge receivable in sliding clearance with said channel, a top oblong rabbet contiguous to the terminal edge and in sliding clearance with two faces of said upper inwardly extending securing flange, and a horizontal base interrupted only by a groove of such shape as to slidingly mate with said upstanding horizontal top runner, (8) whereby four vertical faces and four horizontal faces of one track member, and an equal number of faces on one edge of said saw support plate accurately and firmly control the relative working position of the saw blade in every operative position thereof.

2. A portable table in accordance with claim 1, and further including at least one detachably secured stop means attached to and between said track members and contacting the top of said runners, for preventing removal of said plate member from said guide means, when the stop is secured, and allowing the passage thereby of said plate member when the stop is detached.

References Cited by the Examiner

UNITED STATES PATENTS

| | | | |
|---|---|---|---|
| 2,318,800 | 5/43 | Rakow | 308—3.6 |
| 2,627,657 | 2/53 | Etchen. | |
| 2,630,147 | 3/53 | Garberg. | |
| 2,759,773 | 8/56 | Wilmer et al. | |
| 2,765,820 | 10/56 | Perkins. | |
| 2,770,265 | 11/56 | Pollock. | |
| 2,810,412 | 10/57 | Roug. | |
| 2,818,892 | 1/58 | Price. | |
| 2,902,066 | 9/59 | Borden. | |
| 2,903,026 | 9/59 | Feydenlund. | |
| 2,911,017 | 11/59 | Holder. | |
| 3,073,360 | 1/63 | Villanueva | |

FOREIGN PATENTS

| | | |
|---|---|---|
| 566,455 | 1/45 | Great Britain. |
| 783,112 | 9/57 | Great Britain. |

WILLIAM W. DYER, Jr., *Primary Examiner.*

LEON PEAR, *Examiner.*